_

3,094,558
PROCESS FOR MAKING M-HYDROXY-
BENZOATES
Edwin J. Strojny, Midland, and Dale E. Keeler, Sanford, Mich., assignors to The Dow Chemical Company, Midland, Mich., a corporation of Delaware
No Drawing. Filed Mar. 2, 1961, Ser. No. 92,752
8 Claims. (Cl. 260—521)

This invention relates to an improved process for making m-hydroxybenzoates, i.e., sodium m-hydrozybenzoate and m-hydroxybenzoic acid.

m-Hydroxybenzoic acid is of value as a chemical intermediate for such products as polyester resins, ultraviolet light absorbing compounds, and many other derivatives. It has been made in small yield through the diazotization of m-aminobenzoic acid, but its principal method of preparation in the past has been by the fusion of the disodium salt of m-sulfobenzoic acid in molten potassium hydroxide. m-Sulfobenzoic acid is prepared by sulfonation of benzoic acid with fuming sulfuric acid or sulfur trioxide. This fusion process as described in the literature is a two-step procedure wherein the monosodium salt of m-sulfobenzoic acid is reacted with excess aqueous sodium hydroxide of 60-70% concentration to form a solid mass consisting largely of disodium m-sulfobenzoate and excess sodium hydroxide. This solid mass is then broken up and fused with excess solid potassium hydroxide, the end product being an essentially anhydrous fused mass. m-Hydroxybenzoic acid is recovered by dissolving the reaction mass in water and acidifying the solution with a strong mineral acid such as HCl, whereupon the product precipitates.

Although fairly good yields are obtained from this process, it is wasteful and expensive in that large excesses of both sodium hydroxide and the more costly potassium hydroxide are needed, as well as correspondingly large quantities of acid in the work-up of the product. It is also a cumbersome and time-consuming method not well-suited to large scale manufacture, requiring as it does the preparation and subsequent breaking up of two separate solid rection masses, and is not adaptable to a continuous mode of operation.

The use of posassum hydroxide rather than sodium hydroxide in the fusion step is implied in the literature to be essential. Thus, when Clarke et al., J. Chem. Soc., 1950, 2108, substituted sodium hydroxide for potassium hydroxide in the process, the yield of m-hydroxybenzoic acid dropped from 90% to 17%.

It has now been found that by maintaining a certain minimum quantity of water in the reaction mixture, sodium hydroxide may be used in place of potassium hydroxide with excellent results. Further, it has also been found that by using this new method, the total minimum quantity of sodium hydroxide required is only about 4.5–5.0 moles per mole of m-sulfobenzoic acid as compared to about 7–8 moles combined sodium and potassium hydroxides which are used in the prior art process. Additionally, it has been found that the reaction may be carried out as a one-step process by reacting either m-sulfobenzoic acid or its monosodium salt with the appropriate amount of sodium hydroxide. In some modes of operation, the process may be a continuous one.

Briefly, our invention may be defined as a process whereby a mole of m-sulfobenzoic acid is reacted with at least about 4.5 moles of sodium hydroxide in the presence of about 0.1 mole to about 40 moles of water per mole of sodium hydroxide at a temperature of about 220–400° C. The free m-hydroxybenzoic acid is conveniently isolated as in the old process by acidification of the reaction mixture in aquous solution with a strong mineral acid such as HCl, whereupon the desired product is precipitated in substantially pure form. Overall yields of m-hydroxybenzoic acid from our improved process are of the order of 90%, based upon the starting m-sulfobenzoic acid.

Our process may be operated within a wide range of combinations of water content, temperature, and pressure. The temperature necessary for a satisfactory reaction rate varies in proportion to the water content and the two values for temperature and water content determine the level of pressure under which the reaction must be run.

At temperatures in the lower end of the operable range, for example, at about 220–275° C., the water content of the reaction mixture may vary between about 0.1 and about 0.5 mole per mole of total sodium hydroxide originally present, assuming the starting materials to be sodium hydroxide and m-sulfobenzoic acid as shown in the equation for the reaction:

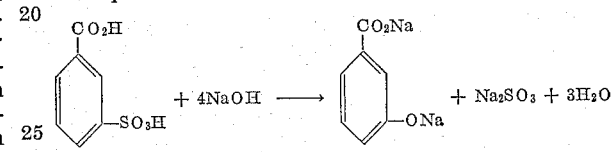

Thus, if the reaction is run using the monosodium salt of m-sulfobenzoic acid, one equivalent of sodium hydroxide is assumed already present in the salt. Similarly, the water content of the reaction mixture is defined as the net amount of water remaining in the reaction mixture at the end of the reaction, and so includes water formed in the reaction plus whatever water is added with the reactants at the start, from which sum is subtracted water removed from the reaction mixture by distillation in the course of the process. It has been found that good results are obtained under the condditions named, that is, at about 220–275° C. and about 0.1–0.5 mole of water content per mole of sodium hydroxide, when at least about 4.5 moles of sodium hydroxide is employed per mole of m-sulfobenzoic acid. Best results are obtained within this range when operating in the presence of about 0.15 to about 0.25 mole of water content per mole of sodium hydroxide, at a temperature of about 230–260° C., and using about 5.0 to about 6.5 moles of sodium hydroxide per mole of m-sulfobenzoic acid.

When the process is operated at 220–275° C., as described, it is a fusion process and the reactants are suitably only solid sodium hydroxide and either solid m-sulfobenzoic acid or a sodium salt thereof. Although water may be added if desired, the water content of the final reaction mixture is conveniently a portion of the water formed by the reaction. The fusion process is ordinarily run under atmospheric pressure with a distillation head and condenser connected to the reaction vessel comprising the means whereby the water content of the mixture is regulated. Such a fusion process as described may be operated under superatmospheric pressure, but such a mode of operation is not ordinarily preferred.

At reaction temperatures above about 275° C., a proportionally higher water content is required in the reaction mixture to prevent serious loss of yield from decomposition. For example, at 275° C., the minimum water content necessary to prevent excessive decomposition is about 0.15 mole of water per mole of sodium hydroxide. At about 300° C., the reaction may be run satisfactorily using about 1.0 mole of water per mole of sodium hydroxide.

A higher water content in the reaction mixture requires a higher reaction temperature in order to get substantially complete reaction. To run the process as an aqueous hydrolysis using aqueous sodium hydroxide of less than 50% concentration, it is necessary to carry out the reaction at temperatures of about 330° C. to about 400° C. with at least about 4.5 moles of sodium hydroxide per mole of m-sulfobenzoic acid, in aqueous solution containing about 4 to about 40 moles of total water per mole of sodium hydroxide, and under at least the autogenous pressure of the system. It is most preferred to run at a temperature of about 330° C. to about 380° C., the other reaction conditions being as specified above. The above range of water content corresponds approximately to the use of 5–40% aqueous sodium hydroxide.

Advantageously, the aqueous hydrolysis mode of operation is carried out in a continuous manner, whereby the reaction solution is passed through a reactor tube or coil of suitable design maintained at a preferred temperature as specified and at a rate such that substantially complete reaction is attained, and the reaction product solution is continuously discharged from the reactor. The product solution may then be worked up as previously described to obtain the m-hydroxybenzoic acid.

Example 1

A nickel pot equipped with a stainless steel stirrer, a reflux condenser and distillation head was charged with 1.9 g. moles of sodium hydroxide and 0.4 g. mole of monosodium m-sulfobenzoate. Heat was applied and the reaction mixture formed a sludge at about 190° C. Water formed by the reaction began to reflux when the temperature of the reaction mixture reached about 250° C. During the reaction, a period of 2.7 hours, water was removed from the mixture periodically by distillation to maintain a minimum reaction temperature of 235° C. and a maximum temperature of 260° C. A total of 0.4 g. mole of water, half of that formed in the reaction, was distilled from the reaction mixture. The cooled reaction mixture was dissolved in 400 ml. of water and the resulting solution was acidified with excess concentrated HCl. The precipitated product represented a yield of 90.2% based on the starting material and it assays 99% pure m-hydroxybenzoic acid, melting point 201.9–202.4° C.

Example 2

The reactor of Example 1 was charged with 1.0 g. mole of sodium hydroxide, 0.2 g. mole of monosodium m-sulfobenzoate, and 0.2 g. mole of water. The reaction mixture was heated at 240–250° C. for six hours, the minimum temperature being maintained at 240° C. by periodic removal by distillation of small amounts of water. A total of 0.12 g. mole of water was removed from the reaction mixture. The reaction mixture was worked up as in Example 1 and a 92% yield of pure m-hydroxybenzoic acid was obtained based on the starting material.

Examples 1 and 2 represent preferred modes of operation of the fusion process. The reaction may also be carried out by adding m-sulfobenzoic acid to aqueous sodium hydroxide in proportions as previously set forth and distilling off water until the temperature of the reaction mixture reaches the limits specified for this mode of operation, that is, 220°–275° C. The reaction is then completed as shown above, retaining a net total of about 0.1–0.5 mole of water per mole of sodium hydroxide in the reaction mixture. Aqueous sodium hydroxide of about 75% concentration has been found suitable for use in this manner of operation. More dilute sodium hydroxide may be used but this requires distillation of excessive amounts of water.

Instead of employing the caustic fusion type of operation which is normally done at or near atmospheric pressure, the reaction may also be run effectively in the presence of larger quantities of water. As more water is used, higher temperatures are required to get a satisfactory rate of reaction, and these higher temperatures in turn make it necessary to run the reaction under at least the autogenous pressure of the system. Examples 3 and 4 illustrate this procedure.

Example 3

An iron bomb was charged with 44.8 g. of purified monosodium m-sulfobenzoate, 40 g. of sodium hydroxide, and 13.5 g. of water. The bomb was sealed and heated at 295–305° C. for 5.3 hours while being agitated by a rocker mechanism. The bomb was then cooled and opened. The contents were dissolved in water and filtered and the filtrate was acidified with concentrated hydrochloric acid, whereupon crystalline m-hydroxybenzoic acid was precipitated. The product weighed 23.8 g. and had a melting point of 200–201° C.

Example 4

An iron bomb was charged with 0.2 g. mole of monosodium m-sulfobenzoate and 0.8 g. mole of sodium hydroxide dissolved in 126 g. of water. The sealed bomb was heated at 377–381° C. for 150 minutes while being agitated by a rocker mechanism. From the acidified reaction mixture there was isolated 21.6 g. of m-hydroxybenzoic acid.

For purpose of commercial manufacture, a reaction mixture similar to that used in Example 4 is advantageously reacted in a continuous manner by passing it through a heated reactor tube or coil under at least the autogenous pressure of the system and at such a rate as to obtain substantially complete reaction, continuously removing the reacted mixture which may then be worked up as previously described.

We claim:

1. A process for making sodium m-hydroxybenzoate which comprises reacting one mole of m-sulfobenzoic acid with at least about 4.5 moles of sodium hydroxide in the continuous presence of about 0.1 to about 40 moles of water per mole of sodium hydroxide and at a temperature of about 220-400° C.

2. A process for making sodium m-hydroxybenzoate which comprises reacting one mole of m-sulfobenzoic acid with at least about 4.5 moles of sodium hydroxide dissolved in about 4 to about 40 moles of water per mole of sodium hydroxide, at a temperature of about 330–380° C., and under at least the autogenous pressure of the system.

3. A process as described in claim 2 wherein the process is operated in a continuous manner.

4. A process for making sodium m-hydroxybenzoate which comprises reacting one mole of m-sulfobenzoic acid with at least about 4.5 moles of sodium hydroxide in the continuous presence of about 0.1 mole to about 0.5 mole of water per mole of sodium hydroxide and at about 220–275° C.

5. A process as described in claim 4 wherein the proportion of sodium hydroxide is about 5.0 to about 6.5 moles.

6. A process as described in claim 4 wherein the reaction temperature is about 230–260° C.

7. A process as described in claim 4 wherein the proportion of water is about 0.15 mole to about 0.25 mole.

8. A process for making sodium m-hydroxybenzoate which comprises reacting one mole of m-sulfobenzoic acid with about 5.0 to about 6.5 moles of sodium hydroxide in the continuous presence of about 0.15 to about 0.25 mole of water per mole of sodium hydroxide and at about 230–260° C.

References Cited in the file of this patent

Clarke et al.: Chemical Society Journal (London), Part III, p. 2111 (1950).